(12) United States Patent
Wang

(10) Patent No.: US 6,604,107 B1
(45) Date of Patent: *Aug. 5, 2003

(54) GENERIC ATTRIBUTE DATABASE SYSTEM FOR STORING ITEMS OF DIFFERENT CATEGORIES HAVING SHARED ATTRIBUTES

(75) Inventor: Hsiaozhang Bill Wang, San Jose, CA (US)

(73) Assignee: eBay Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/563,069

(22) Filed: Apr. 24, 2000

(51) Int. Cl.⁷ .............................................. G06F 17/00
(52) U.S. Cl. ...................... 707/101; 707/102
(58) Field of Search ................. 707/101, 102, 707/103, 104.1, 3, 103 R, 103 Y, 1, 100; 709/201, 202, 203, 217

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,811,199 A | 3/1989 | Kuechler et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,442 A | 1/1994 | Hotta et al. |
| 5,297,031 A | 3/1994 | Gutterman et al. |

(List continued on next page.)

FOREIGN PATENT DOCUMENTS

| | | |
|---|---|---|
| CA | 2253543 | 3/1997 |
| FR | 2658635 A1 | 8/1991 |

(List continued on next page.)

OTHER PUBLICATIONS

Van Heck, E., "Experiances with Electronic Auctions in the Dutch Flower Industry," Focus Theme, 6 pages, No Date Given.

Warbelow, A., et al., "AUCNET: TV Auction Network System," Harvard Business School Case Study, HBVR# 9–190–001, pp. 1–15, Apr. 12, 1996.

(List continued on next page.)

*Primary Examiner*—Uyen T Le
(74) *Attorney, Agent, or Firm*—Blakely, Sokoloff, Taylor & Zafman, LLP

(57) ABSTRACT

Embodiments of the invention provide a method and apparatus for storing multiple items across different categories in a database. One embodiment of the present invention provides a database that includes an attribute value table that has item entries for items of different categories. Each item entry has attribute values for attributes of the items. The database also includes an attribute map table that has attribute map entries. The attribute map entries have attribute map values. Additionally, an attribute value is associated with an attribute map entry, such that the attribute values are translated based on the attribute map values of the associated attribute map entry. In one embodiment, the translating of an attribute value includes determining an attribute type associated with the attribute value.

43 Claims, 10 Drawing Sheets

U.S. PATENT DOCUMENTS

| | | |
|---|---|---|
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,339,391 A | 8/1994 | Wroblewski et al. |
| 5,375,055 A | 12/1994 | Togher et al. |
| 5,394,324 A | 2/1995 | Clearwater |
| 5,426,281 A | 6/1995 | Abecassis |
| 5,479,600 A | 12/1995 | Wroblewski et al. |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,627,979 A | 5/1997 | Chang et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,974,412 A | 10/1999 | Hazlehurst et al. |
| 5,991,739 A | 11/1999 | Cupps et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,356,913 B1 * | 3/2002 | Chu et al. ................ 707/103 R |

FOREIGN PATENT DOCUMENTS

| | | |
|---|---|---|
| WO | WO 92/15174 | 9/1992 |
| WO | WO 95/17711 A1 | 6/1995 |
| WO | WO 96/34356 | 10/1996 |
| WO | WO 97/37315 | 10/1997 |
| WO | WO 99/63461 A1 | 12/1999 |
| WO | 00/17136 | 11/2000 |
| WO | 01/12398 | 8/2001 |

OTHER PUBLICATIONS

Zwass, V., "Electronic Commerce: Structure and Issues," International Journal of Electronic Commerce, 1(1):3–23, Fall, 1996, http://www.cba.bgsu.edu/ijec/v1n1/p003full.html, Jun. 10, 1999.

Neo, B.S., "The Implementation of an Electronic Market For Pig Trading in Singapore," Journal of Strategic Information Systems, 1(5):278–288, Dec. 1992.

"Onsale: Onsale Brings Thrill of auctions and Bargain Hunting Online; Unique Internet Retail Service Debuts with Week–Long Charity Auction for The Computer Museum in Boston," Business Wire (DIALOG File 810), 3 pages., Jun. 10, 1999.

"Onsale Joins Fray as Online Shopping Picks up Speed: INTERNET BOOMS," Computer Reseller News, p. 73, Jun. 5, 1995, PROMT(R) (DIALOG File 16) 1 page, Jun. 10, 1999.

"Personal Optimized Decision/Transaction Program," IBM Technical Disclosure Bulletin, 38(1):83–84, Jan. 1995.

Post, et al., "Application of auctions as a Pricing Mechanism For the Interchange of Electric Power," IEEE Transactions On Power Systems, 10(3):1580–1584, Aug. 1995.

Reck, M., "Formally Specifying an Automated Trade Execution System," Journal of Systems and Software, 21:245–252, 1993.

Reck, M., "Trading–Process Characteristics of Electronic Auctions," Focus Theme, 7 pages, No Date Given.

Rockoff, T.E., et al., "Design of an Internet–Based system for Remote Dutch Auctions," Internet Research: Electronic Networking Applications and Policy, 5(4):10–16, Jan. 1995.

Siegmann, Ken, "Nowhere to go but up. (Onsale CEO Jerry Kaplan) (PC Week Inside) (Inside People)" PC Week, 12(42):pA5(1), Oct. 23, 1995, Trade & Industry Database (DIALOG File 148) 3 pages, Jun. 10, 1999.

Tjostheim I., et al., "A case study of an on–line auction for the World Wide Web," Norwegian Computing Center, http://www.nr.no/gem/elcom/publikasjoner/enter98e.html, 10 pages, Jun. 10, 1999.

Turban, E., "Auctions and Bidding on the Internet: An Assessment," Focus Theme, 5 pages, No Date Given.

"Anonymous Delivery of Goods in Electronic Commerce," IBM Technical Disclosure Bulletin, 39(3):363–366, 1996.

Clemons, E., et al., "Evaluating the Prospects for Alternative Electronic Securities Markets," International Conference on Information Systems, 12:53–61, 1991.

EM Electronic Markets, Newsletter of the Competence Centre Electronic Markets, University of St. Gallen, Institute for Information Management, No. 9/10, 36 pages, Oct. 1993.

Graham, I., "The Emergence of Linked Fish Markets in Europe," Focus Theme, 4 pages, No Date Given.

Hess, C.M., et al., "Computerized loan Organization System: An Industry Case Study of the Electronic markets Hypothesis," MIS Quarterly, 18(3):251–274, Sep. 1994.

Klein, S., "Introduction to Electronic Auctions," Focus Theme, 4 pages, No Date Given.

Lee, Ho Geun, "AUCNET: Electronic Intermediary for Used–Car Transactions," Focus Theme, 5 pages, No Date Given.

Lee, Ho Geun, "Electronic Brokerage and Electronic Auction: The Impact of IT on Market Structures," Proceedings fo the 29th Annual Hawaii International Conference on System Sciences, IV:397–406, 1996.

Malone, T.W., et al., "Electronic Markets and Electronic Hierachies," Communication of the ACM, 30(6):484–497, Jun. 1987.

Mardesich, J., "Onsale Takes Auction Gavel Electronic," Computer Reseller News, 2 pages, Jul. 8, 1996.

Massimb, M.N., "Electronic Trading Market Structure and Liquidity," Financial Analysts Journal, 50(1):39–50, Jan.–Feb. 1994.

International Search Report PCT/US01/13253, 3 pages, Jul. 31, 2001.

PCT US01/13253 Written Opinion, Ebay, Inc., Mailed Jan. 24, 2002.

Business Editors, "Mediappraise: Mediappraise Receives National Award for Web–Based Technology That Enables Companies to Solve Thorny HR Problems," Dec. 14, 1998, 2 pgs., www.businesswire.com.

Meade, J., "Visual 360: A Performance Appraisal System That's 'Fun' (Evaluation), " HRMagazine, 44, 7, 2 pgs., Jul. 1999, Society for Human Resource Management.

Preist, C., et al., "Adaptive Agents in a Persistent Shout Double Auction," Proceedings, $1^{st}$ International Conf. on Information and Computation Economies, Oct. 25–28, 1998, pgs. 11–18, Charleston, N.C.

Resnick, P., et al., "Reputation Systems," Dec. 2000, Assoc. for Computing Machinery, Communications of the ACM, vol. 43, n. 12, 4 pgs.

* cited by examiner

Fig. 3

| GENERIC ATTRIBUTE TABLE | SITE ID | ATTRIBUTE ID | ATTRIBUTE NAME | ATTRIBUTE TYPE |
|---|---|---|---|---|
| | 301 | 303 | 305 | 307 |

| ITEM ID | ATTRIBUTE #1 | ATTRIBUTE #2 | ... | ATTRIBUTE #30 |
|---|---|---|---|---|
| 502 | 504 | 506 | | 508 |

ATTRIBUTE VALUE TABLE

206

ATTRIBUTE MAP TABLE 208

| SITE ID | CATEGORY ID | ATTRIBUTE POSITION | ATTRIBUTE ID | DISPLAY POSITION | DISPLAY LENGTH | SEARCH FLAG |
|---|---|---|---|---|---|---|
| 602 | 604 | 606 | 608 | 610 | 612 | 614 |

Fig. 6

| MAKE MODEL | MILEAGE | YEAR | PRICE | BIDS | ENDS PST |
|---|---|---|---|---|---|
| FORD EXPEDITION | 800 miles | 2000 | $35,000 | | |
| HONDA ACCORD | 750 miles | 2000 | $18,000 | | |
| SATURN SC1 | 400 miles | 2000 | $17,500 | | |
| HONDA CIVIC | 900 miles | 2000 | $17,000 | | |
| 702 | 704 | 706 | 708 | | |

Fig. 7

SEARCH TITLE [____] SEARCH — 813
search tips
☐ search titles, descriptions and vehicle characteristics
(use this to find more items)

CURRENT BID PRICE: Between   $ [____] and
[____]

VEHICLE MAKE: [____ ▼] — 802

VEHICLE MODEL: [____ ▼] — 804

VEHICLE YEAR: Between [Before 1950 ▼]—806 and [2001 ▼]—808

MILEAGE RANGE: [Less than 1000 miles ▼]—810

LOCATION: [All eBay- includes all regions ▼]—812

GENERIC ATTRIBUTE DATABASE SYSTEM FOR STORING ITEMS OF DIFFERENT CATEGORIES HAVING SHARED ATTRIBUTES

FIELD OF THE INVENTION

The invention relates to databases. More specifically, the invention relates to a system and method for providing generic attributes across multiple categories in such databases.

BACKGROUND OF THE INVENTION

With the advent of the computer industry, databases have played an important role in order to store the vast amounts of information employed in such an industry. Different types of databases have been developed depending on the type of information, size, application as well as other factors.

Currently, one type of database is employed for the storage of different types of categories having specific attributes. One application of such a database is used in conjunction with an Internet-based auction facility of different consumer products and services. For the storage of e-commerce goods or consumer product and/or service information into a database, each product (e.g., automobiles and shoes) will have its own category. Typically, in such databases, each category is stored in a separate data structure (e.g., a table), wherein such data structures will include the specific attributes for that category. For example, for a shoes category, the attributes could include (1) color, (2) size, and (3) type of material. Accordingly, a data structure is created that includes these attributes. Similarly, for an automobile category, the attributes could include (1) make, (2) model, (3) year and (4) color. Therefore, a separate data structure is created for these attributes.

Disadvantageously, this type of database wherein a table is allocated for each type of category makes the design, the implementation, the testing as well as the management of such a system very difficult. Accordingly, there is a need for an improved database system that is able to store vast amounts of information across a number of different categories, while being easier to design, implement, test and manage in comparison to the conventional database systems.

SUMMARY OF THE INVENTION

One embodiment of the present invention provides a database that includes an attribute value table that has item entries for items of different categories. Each item entry has attribute values for attributes of the items. The database also includes an attribute map table that has attribute map entries. The attribute map entries have attribute map values. Additionally, an attribute value is associated with an attribute map entry, such that the attribute values are translated based on the attribute map values of the associated attribute map entry.

BRIEF DESCRIPTION OF THE DRAWINGS

Embodiments of the invention may be best understood by referring to the following description and accompanying drawings which illustrate such embodiments. In the drawings:

FIG. 3 is a data structure stored in a database according to embodiments of the present invention.

FIG. 5 is another data structure stored in a database according to embodiments of the present invention.

FIG. 6 is another data structure stored in a database according to embodiments of the present invention.

FIG. 7 is an output window presenting information outputted from a database according to embodiments of the present invention.

FIG. 8 is an input window to receive information to be inputted into a database according to embodiments of the present invention.

DETAILED DESCRIPTION

A method and system for storing multiple items across different categories in a database are described. In the following description, for purposes of explanation, numerous specific details are set forth in order to provide a thorough understanding of the present invention. It will be evident, however, to one skilled in the art that the present invention may be practiced without these specific details.

Transaction Facility

Figure 1:
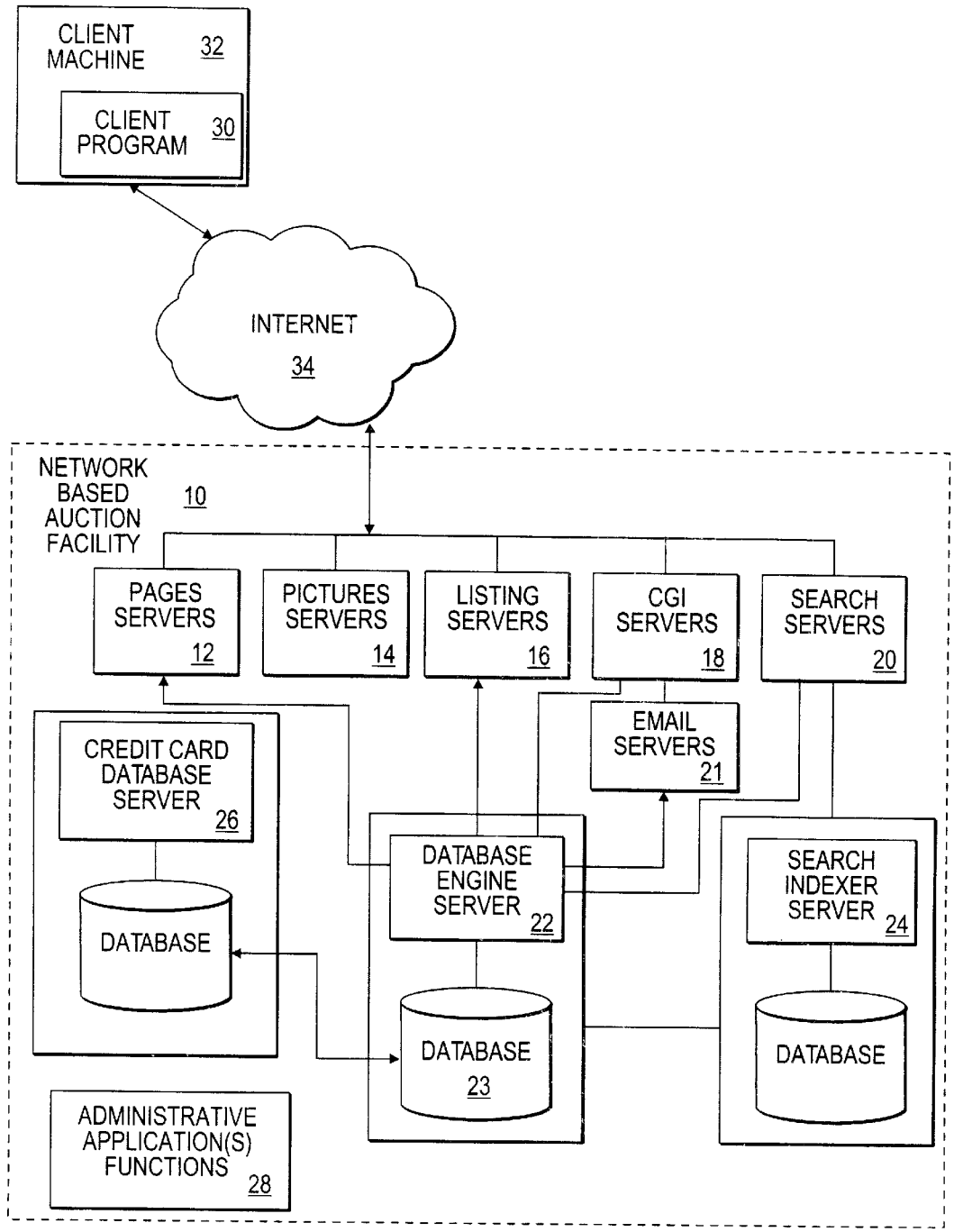
FIG. 1 is a block diagram illustrating an exemplary network-based transaction facility according to embodiments of the present invention.

FIG. 1 is block diagram illustrating an exemplary network-based transaction facility in the form of an Internet-based auction facility 10 that incorporates embodiments of the present invention. While an exemplary embodiment of the present invention is described within the context of an auction facility, it will be appreciated by those skilled in the art that the invention will find application in many different types of computer-based, and network-based facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10. The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
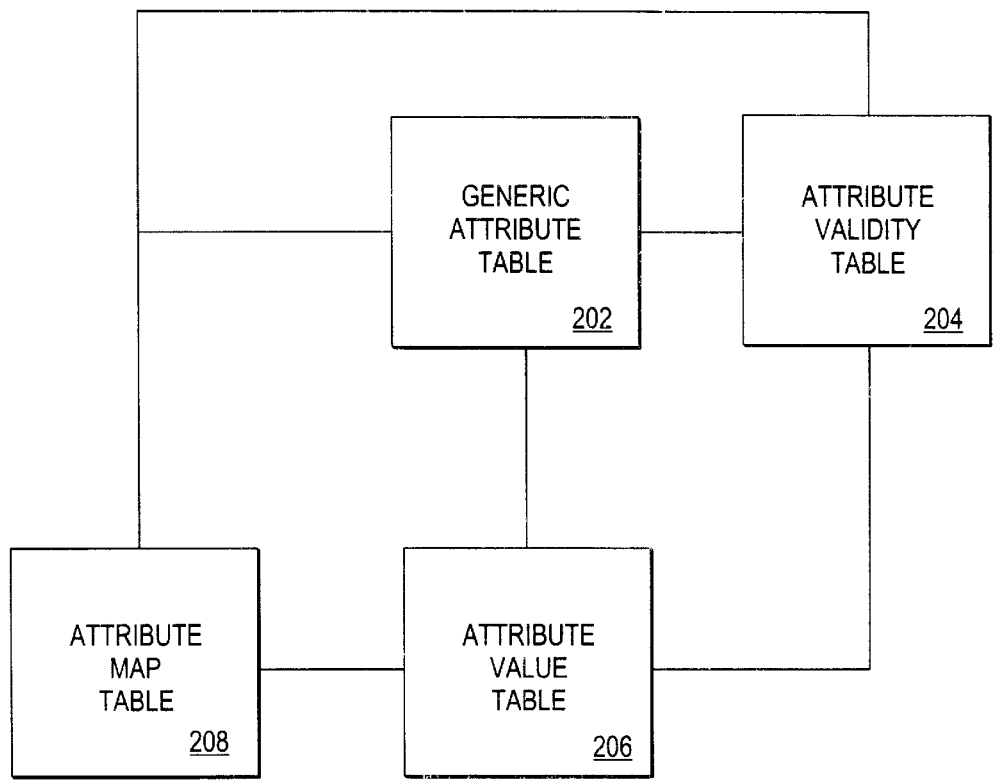
FIG. 2 is a database according to embodiments of the present invention.

FIG. 2 is a database diagram illustrating an exemplary database 23, maintained by and accessed via the database engine server 22, which at least partially implements and supports the auction facility 10. In one embodiment, the database 23 is implemented as a relational database and includes a number of tables having entries or records that are linked by indices and keys.

Database 23 includes generic attribute table 202, attribute validity table 204, attribute value table 206 and attribute map table 208. Generic attribute table 202 is a data structure that includes and defines all the attributes across all the different items of the different categories included in database 23. For example, in one embodiment, database 23 is used in conjunction with the tracking of different e-commerce goods or consumer products (e.g., automobiles, shoes) and/or services. Accordingly, these different categories have attributes that are different as well as attributes that are the same. For example, the categories of shoes and automobiles both may have a color attribute. In contrast, the category of automobiles may have a year attribute, indicating the year of the automobile, while the category of shoes may not have this attribute.

FIG. 3 is a diagrammatic representation of an exemplary embodiment of generic attribute table 202 that is populated with records or entries for attributes for different categories of items (e.g., consumer products and/or services) used in conjunction with auction facility 10. Generic attribute table 202 includes site identification (ID) column 301 that stores the site (e.g., country) in which the item is being sold and/or is located. In one embodiment wherein the site is a country that is not English, the attributes are stored and/or outputted in the native language (e.g., Japanese). Attribute ID column 303 is a unique identifier within database 23 for that particular attribute. In one embodiment, the attribute ID for a particular attribute is independent of the language, thereby allowing attributes, which are stored and/or outputted in different languages, to have the same attribute ID. For example, if a color attribute is stored in both English and Japanese, the site ID would be different but the attribute ID would be the same.

Moreover, the attribute ID can be the same across different categories within database 23 for those attributes that are the same. For example, a color attribute can be used in conjunction with both automobiles and shoes. Therefore, even though two separate categories include a "color" attribute, there is a need for only one entry into database 23. Accordingly, database 23 includes attributes that can be shared across different categories of products, thereby allowing for fewer numbers of tables to be designed, created and maintained than conventional databases wherein a table in such a database is designed, created and maintained for each category.

Self-defined, attribute name column 305 is the name of the attribute. Further, attribute type column 307 is the type defined for that attribute. In one embodiment the attribute types include multiple choice, Boolean, integer and float. Multiple-choice type is for those attributes that have discrete values associated therewith. For example, the attribute type for color is a multiple-choice type, as such a type can be different colors (e.g., blue, green or red). The "Boolean" attribute type is for those attributes that have one of two conditions. For example, air conditioning is a Boolean type, as the product (e.g., an automobile or house) either does or does not have air conditioning. Moreover, the integer and float could be incorporated into various categories including, for example, the year and the price of the item, respectively. However, embodiments of the invention are not limited to these attribute types, as other attribute types can be included in attribute type column 307.

Figure 4:
FIG. 4 is another data structure stored in a database according to embodiments of the present invention.

FIG. 4 is a diagrammatic representation of an exemplary embodiment of attribute validity table 204 that is populated with records or entries for valid values for attributes for different categories of items (e.g., consumer products and/or services), as defined in generic attribute table 202, used in conjunction with auction facility 10. In one embodiment, attribute validity table 204 includes the valid values for attributes that have attribute types of multiple choice, integer and float. However, attribute validity table 204 is not so limited as any type of attribute that includes a range or list of valid values can be included in attribute validity table 204.

Attribute validity table 204 includes site ID column 402 that, as described above, stores the site (e.g., country) in which the item is being sold and/or is located. In one embodiment wherein the site is a country that is not English, the attributes are stored and/or outputted in the native language (e.g., Japanese). Additionally as described above, attribute ID column 404 stores a unique identifier within database 23 for that particular attribute.

Moreover, valid value ID column 406 stores a unique identification number for a valid value for a particular attribute. Valid value column 408 stores the valid values for the attributes defined in generic attribute table 202. Because there can be multiple valid values for a particular attribute, attribute validity table 204 can include different valid value IDs and valid values associated with one attribute. One example would be an attribute having a "multiple choice" attribute type. Assuming that the color attribute is a "multiple choice" type and that its attribute ID is one, this attribute ID will be the same for three valid value IDs (e.g., one for red, two for blue and three for green). Accordingly, attribute validity table 204 will have three different entries for these three color attributes, wherein the attribute ID and site ID for all three entries are the same, while the valid value ID and valid value are different for the attribute.

Maximum range column 410 and minimum range column 412 store the ranges of valid values for the attributes defined in generic attribute table 202 that are defined by a range. One such range would be the year of the product. Moreover because attributes are shared across different items in different categories, there can be multiple valid ranges for a particular attribute. Accordingly, attribute validity table 204 can include multiple entries having different maximum and minimum ranges for a particular attribute. For example, assuming that for the year attribute for items the attribute ID is three and that there are three valid ranges for this attribute (e.g., (1) 1930–1939, (2) 1940–1949 and (3) 1950–1959), the valid value ID will be different for all three different year ranges, while having a different entry into attribute validity table 204 for each one. Further, for these three entries, the site ID and the attribute ID remain constant. Accordingly, attribute validity table 204 includes valid values for attributes that can be shared across different categories of products, thereby allowing for fewer numbers of tables to be designed, created and maintained than conventional databases. Moreover in one embodiment valid value column 408 is mutually exclusive of maximum range column 410 and minimum range column 412. For example, if an attribute (e.g., color) is a multiple choice attribute type, this attribute is defined by discrete components (e.g., red, blue or green) and not by a range.

FIG. 5 is a diagrammatic representation of an exemplary embodiment of attribute value table 206 that is populated with records or entries of attribute values of actual items (i.e., attribute value entries) stored in database 23 used in conjunction with auction facility 10. In one embodiment, the number of attributes for a particular item is limited to 30. However, embodiments of the present invention are not so limited, as an item can be have any number of attributes associated therewith.

Item ID column 502 is a unique identifier (i.e., an identification number) across database 23 for an item stored therein. For example, assuming that 10 different automobiles and 10 different pairs of shoes are stored in database 23, all 10 different automobiles and all 10 different pairs of shoes receive a unique identifier. Attributes #1–30 columns 504–508 define the values of the attributes, but not the attribute type (e.g., color), for a particular item that has a unique identifier. For example, one entry could include an item ID of 221264646, which has three different attributes: (1) attribute #1 is 1956, (2) attribute #2 is three and (3) attribute #3 is one.

FIG. 6 is a diagrammatic representation of an exemplary embodiment of attribute map table 208 that is populated with records or entries for each attribute stored in attribute value table 206 (i.e., attribute map entries) that is used in conjunction with auction facility 10. These records or entries include mapping or translation values (i.e., attribute map values or translation components) for the attributes. In one embodiment, the mapping or translation values include the category and attribute types for the attribute value.

Attribute map table 208 includes site ID column 602 that, as described above, stores the site (e.g., country) in which the item is being sold and/or is located. Category ID column 604 stores the type of category (e.g., automobile or shoes) that the attribute is within. Attribute position column 606 stores the position within the category that the attribute is located. For example, assuming that the category includes three attributes: (1) color, (2) size and (3) type of material, the attribute position for size would be two. Attribute map table 208 also includes attribute ID column 608 and is defined as described above in conjunction with FIGS. 3–4.

Display position column 610 stores the column position within a display interface when the attribute is outputted on such an interface. One example of a display interface is shown in FIG. 7. In particular, FIG. 7 includes output display interface 700. In one embodiment, output display interface 700 is a markup language page interface displayed by a browser. However, it will be appreciated that the display interface could comprise user interfaces presented by any WINDOWS® client application or stand-alone application, and need not comprise markup-language documents.

Output display interface 700 is a display interface for an automobile category based on a search within database 23 for certain automobiles. Accordingly, columns 706–712 include the make-model, the mileage, the year and the price, respectively of different automobiles being displayed in output display interface 700. Assuming that for an attribute entry in attribute map table 208 that is being outputted to output display interface 700 the display position is three, the associated attribute (i.e., the year attribute) would be positioned at column 3 of output display interface 700.

Additionally, display length column 612 stores the number of characters being displayed in a display interface when the attribute is outputted on such an interface. Returning to output display interface 700, the display length for the year attribute would be four (one for each digit in the year).

Moreover, search flag column 614 stores a number, when translated, defines whether this attribute is searchable and assuming that the particular attribute is searchable, whether the particular attribute was used for searching in a retrieval process within database 23. When an attribute is considered searchable, any retrieval processes from database 23 can employ such an attribute. For example, if a user of database 23 desires to find all of the cars in database 23 that have the color attribute of "blue" and the color attribute is searchable, such a user can use this color attribute to search and retrieve all blue-colored colors from database 23.

Use and Operation of Transaction Facility

Figure 9:
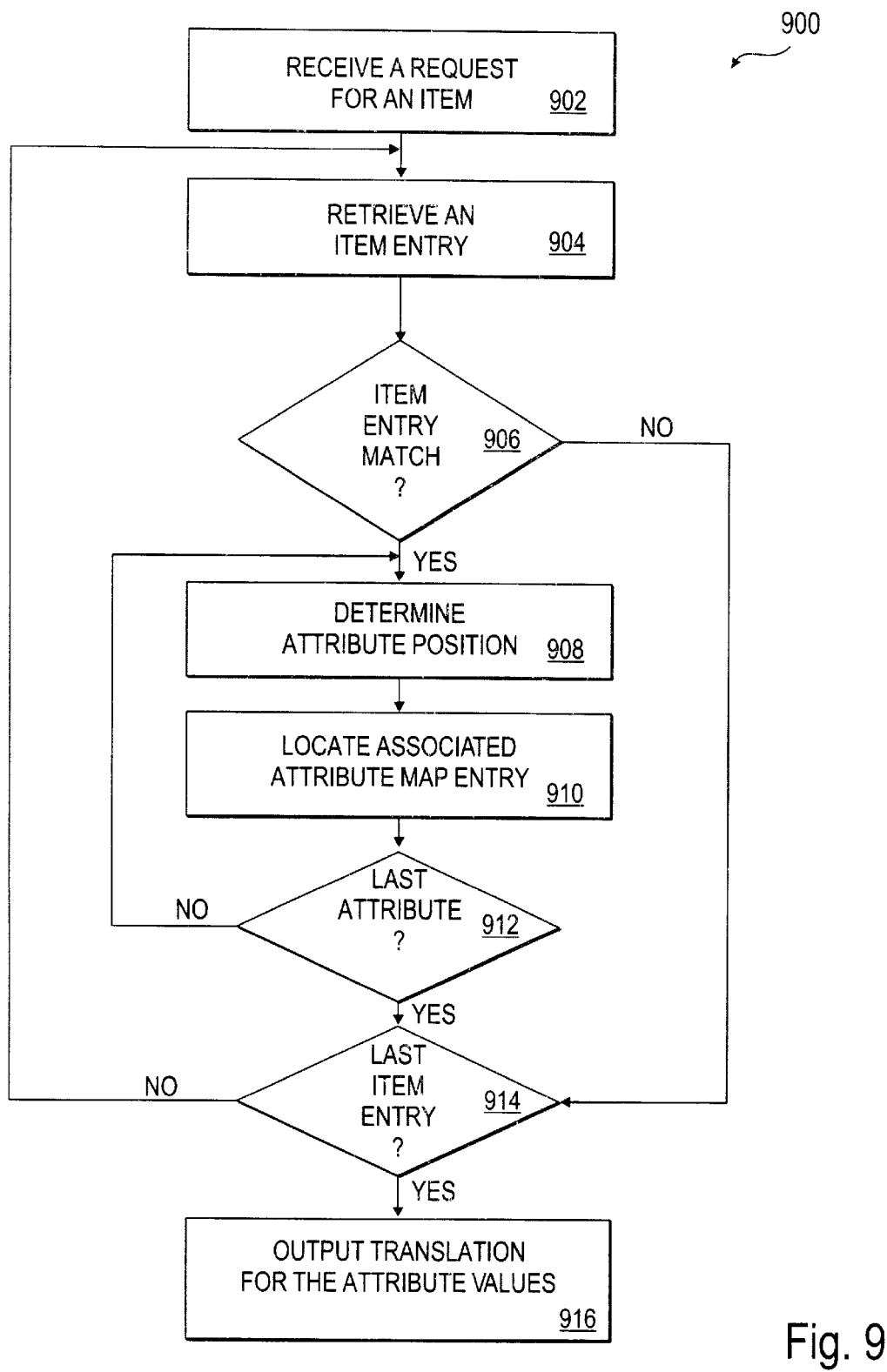
FIG. 9 is a flowchart for use and operation of a transaction facility according to embodiments of the present invention.

In conjunction with output display interface 700 of FIG. 7 and input display interface 800 of FIG. 8 for an automobile category, the use and operation of the auction facility 10 in accordance with embodiments of the present invention will be described with reference to flow chart shown in FIG. 9.

During the bidding process for auction items, a user of the auction facility 10 may desire to search for particular auction item for which to bid. Accordingly, the user is presented with input display interface 800 through which the user provides certain search criteria for searching for and retrieving items from database 23. In one embodiment, input display interface 800 is a markup language page interface displayed by a browser. However, it will be appreciated that the display interface could comprise user interfaces presented by any WINDOWS® client application or stand-alone application, and need not comprise markup-language documents.

Input display interface 800 for an automobile category provides make field 802 and model field 804 into which a user may enter the make and model of the automobiles. Input display interface 800 also includes minimum year range field 806 and maximum year range field 808 into which a user may enter the range of years of the automobiles. Moreover, input display interface 800 includes mileage range field 810 and location field 812 into which a user may enter the mileage and location of the automobiles. Once the users enter the information for all or some of these fields and presses search button 813, method 900 commences, at block 902, wherein search servers 20 receives a request for all automobiles in database 23 that include the attributes that the user entered in fields 802–812.

Search servers 20 forwards this search request to database engine server 22. At block 904, database engine server 22 retrieves an item entry from the attribute value table 206 and derives the site ID and the category ID. In particular, the site ID and the category ID are derived from the item ID in the item entry through a decoding or translation procedure, known in the art. At decision block 906, database engine server 22 checks to see if the site ID and the category ID match the requested site ID and category ID from the search request. If the site ID and the category ID do not match the requested site ID and category ID from the search request, database engine server 22, at decision block 914, determines if this is the last item entry in attribute value table 206, which is further described below.

If, at decision block 906, the site ID and the category ID do match the requested site ID and category ID from the search request, database engine server 22, at block 908, database engine server 22 determines the attribute position of the first attribute based on its location in the item entry. For example, attribute #1 column 504 stores the first attribute value. Accordingly, the attribute position is one for this attribute value.

At block 910, database engine server 22 traverses attribute map table 208 to find the associated attribute map entry. In particular, database engine server 22 matches the derived site ID, category ID and attribute position to the site IDs, category IDs and attribute positions in the attribute map entries. Once the associated attribute map entry is found, at block 910, database engine server 22 generates a translation for the attribute value. In particular, based on the associated attribute map entry, the translation of the attribute value includes (1) the attribute ID from attribute ID column 608, (2) the display position from display position column 610, (3) the display length from display length column 612 and (4) the search flag from search flag column 614.

Further, database engine server 22 translates the attribute value by traversing generic attribute table 202 to find the associated attribute entry. In particular, database engine server 22 matches the site ID and the attribute ID from the attribute map entry. Once the associated attribute entry is found, database engine server 22 determines (1) the attribute name from attribute name column 305 and (2) the attribute type from attribute type column 307. At decision block 912, database engine server 22 checks to see if this is the last attribute for this item entry in attribute value table 206. If this is not the last attribute, database engine server 22, returning to block 908, determines the attribute position of the next attribute in the item category based on its location therein. If this is the last attribute, at decision block 912, database engine server 22 checks to see if this is the last entry, at block 914. If this is not the last entry, database engine server 22, at block 904, retrieves the next item entry. If this is the last entry, database engine server 22, at block 916, outputs the translation for the attribute values for each item that matched. In one embodiment, this output is formatted into a display interface, as illustrated in FIG. 7.

Figure 10:
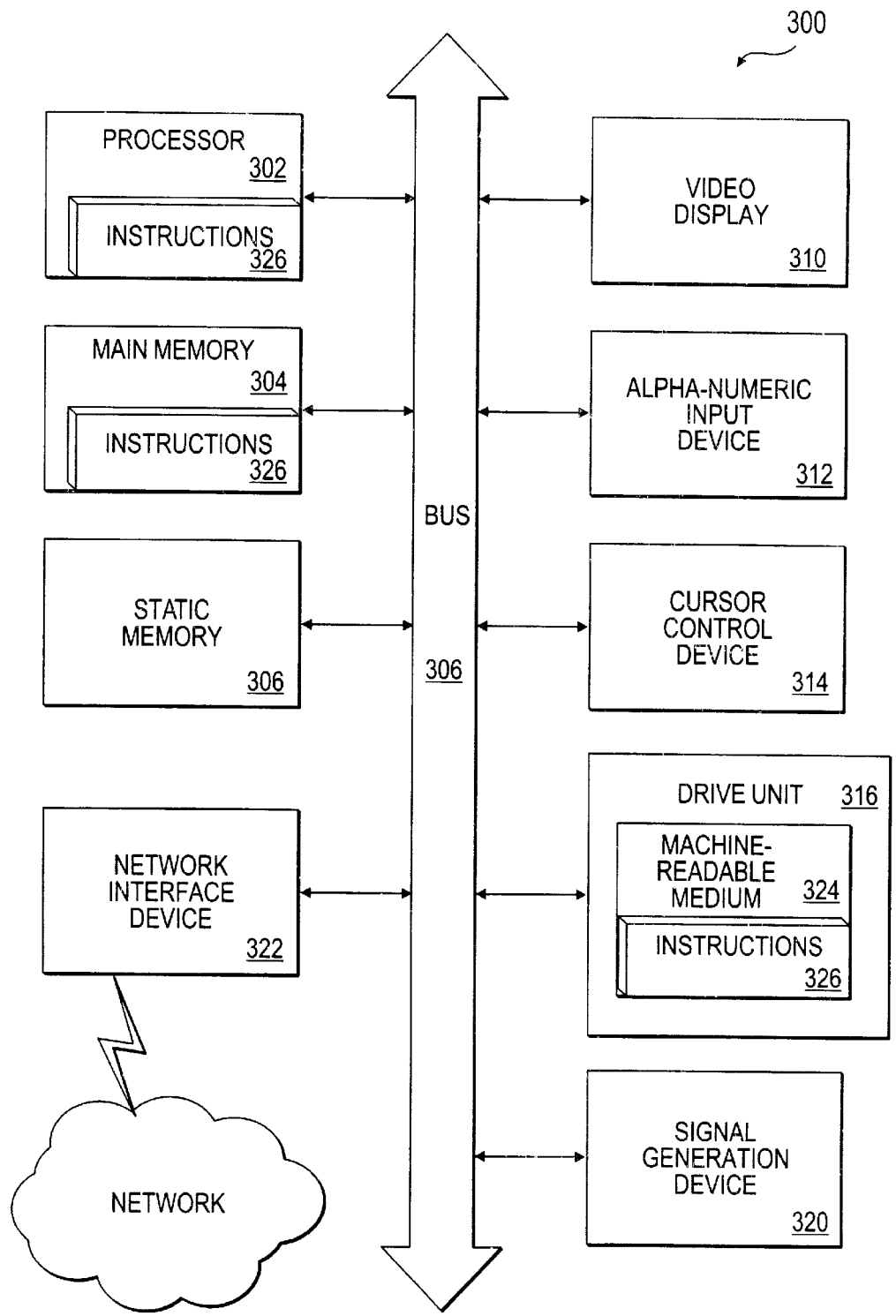
FIG. 10 is a diagrammatic representation of a machine used in conjunction with systems and methods according to embodiments of the present invention.

FIG. 10 shows a diagrammatic representation of machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g. a keyboard), a cursor control device 314 (e.g. a mouse), a disk drive unit 316, a signal generation device 320 (e.g. a speaker) and a network interface device 322

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for storing multiple items across different categories in a database have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A machine-readable medium having stored thereon a database, the database comprising:

a generic attribute table having attribute entries for attributes of items of different categories, wherein at least one attribute entry of the attribute entries is shared across at least two different categories;

an attribute value table having attribute value entries for attribute values for the attributes;

an attribute validity table having valid value entries for the attribute values; and an attribute map table having attribute map entries, the attribute map entries having attribute map values, wherein an attribute value is associated with an attribute map entry, such that the attribute values are translated based on the attribute map values of the associated attribute map entry.

2. The machine-readable medium of claim 1, wherein translating the attribute values includes determining an attribute type associated with the attribute values.

3. The machine-readable medium of claim 1, wherein translating the attribute values includes determining display positions for the attribute values within an output window.

4. The machine-readable medium of claim 1, wherein translating the attribute values includes determining display lengths for the attribute values within an output window.

5. The machine-readable medium of claim 1, wherein the different categories included different product and service categories.

6. A machine-readable medium having stored thereon a database, the database comprising:

a generic attribute table having attribute entries for attributes of items of different categories, wherein at least one attribute entry of the attribute entries is shared across at least two different categories;

an attribute value table having attribute value entries for attribute values for the attributes; and an attribute map table having attribute map entries for the attribute values, wherein each attribute value has an associated attribute entry and an attribute map entry, the associated attribute map entry and the associated attribute entry to determine the attribute type and the category for the associated attribute value.

7. The machine-readable medium of claim 6, further including an attribute validity table having valid values for the attributes of the items of the different categories.

8. The machine-readable medium of claim 7, wherein the valid values include a range of values that is valid.

9. The machine-readable medium of claim 7, wherein the attribute validity table includes valid values for the attributes that are shared by at least two items from at least two different categories.

10. The machine-readable medium of claim 6, wherein the associated attribute map entry determines display positions for the associated attribute value within an output window.

11. The machine-readable medium of claim 6, wherein the associated attribute map entry determines a display length for the associated attribute value within an output window.

12. The machine-readable medium of claim 6, wherein the generic attribute table includes an attribute entry that is shared by at least two items from at least two different categories.

13. The machine-readable medium of claim 6, wherein the different categories included different e-commerce categories.

14. A method comprising:
storing attribute entries for attributes of items of different categories into a generic attribute table of a database, wherein at least one attribute entry of the attribute entries is shared across at least two different categories;
storing values for the attributes of items of different categories into an attribute value table of the database;
storing valid value entries for the values for the attributes into an attribute validity table of the database; and
storing translation components of the values for the attributes of the items of the different categories into an attribute map table of the database, the translation components to translate the values of the attributes of the items, the translation to include an attribute type of the values of the attributes and a category of the different categories of items having the attribute value.

15. The method of claim 14, wherein the translation of the values of the attributes of the items includes determining an attribute type for the values of the attributes of the items.

16. The method of claim 14, wherein the translation of the values of the attributes of the items includes determining a display position for the values of the attributes within an output window.

17. The method of claim 14, wherein the translation of the values of the attributes of the items includes determining a display length for the values of the attributes within an output window.

18. The method of claim 14, wherein the different categories included different product and service categories.

19. A method comprising:
storing attributes of items of different categories into a generic attribute table of a database, wherein at least one attribute entry of the attribute entries is shared across at least two different categories;
storing attribute values of the items of the different categories into an attribute value table of the database; and
storing translation components of the values for the attributes of the items of the different categories into an attribute map table of the database, wherein each attribute value has an associated attribute in the generic attribute table and associated translation components in the attribute map table, the associated attribute and the associated translation components to determine an attribute type and the category for the associated attribute value.

20. The method of claim 19, further including storing valid values for the attributes of the items of the different categories into an attribute validity table of the database, wherein each attribute value has associated valid values in the attribute validity table, the associated valid values to validate the associated attribute value.

21. The method of claim 20, wherein the valid values include a range of values that are valid.

22. The method of claim 20, wherein the attribute validity table includes valid values for the attributes that are shared by at least two items from at least two different categories.

23. The method of claim 19, wherein the associated translation components determine a display position for the associated attribute value within an output window.

24. The method of claim 19, wherein the associated translation components determine a display length for the associated attribute value within an output window.

25. The method of claim 19, wherein the generic attribute table includes an attribute entry for an attribute that is shared by at least two items from at least two different categories.

26. The method of claim 19, wherein the different categories included different e-commerce categories.

27. A method comprising:
generating a generic attribute table for a database, wherein the generic attribute table includes attribute entries for attributes of items of different categories, wherein at least one attribute entry of the attribute entries is shared across at least two different categories;
generating an attribute value table for the database, wherein the attribute value table includes entries for the values of the attributes of different categories; and
generating an attribute map table for the database, wherein the attribute map table includes attribute map entries having attribute map values, wherein a value of an attribute is associated with an attribute map entry, such that the values of the attributes are translated based on the attribute map values of the associated attribute map entry.

28. The method of claim 27, wherein translating the attribute values includes determining an attribute type associated with the values of the attributes.

29. The method of claim 27, wherein translating the values of the attributes includes determining display positions for the values of the attributes within an output window.

30. The method of claim 27, wherein translating the values of the attributes includes determining display lengths for the attribute values within an output window.

31. A machine-readable medium that provides instructions, which when executed by a processor, cause said processors to perform operations comprising:
storing attribute entries for attributes of items of different categories into a generic attribute table of a database, wherein at least one attribute entry of the attribute entries is shared across at least two different categories;
storing values for the attributes of items of different categories into an attribute value table of the database;
storing valid value entries for the values for the attributes into an attribute validity table of the database; and
storing translation components of the values for the attributes of the items of the different categories into an attribute map table of the database, the translation components to translate the values of the attributes of the items, the translation to include an attribute type of the values of the attributes and a category of the different categories of items having the attribute value.

32. The machine-readable medium of claim 31, wherein the translation of the values of the attributes of the items includes determining an attribute type for the values of the attributes of the items.

33. The machine-readable medium of claim 31, wherein the translation of the values of the attributes of the items includes determining a display position for the values of the attributes within an output window.

34. The machine-readable medium of claim 31, wherein the translation of the values of the attributes of the items includes determining a display length for the values of the attributes within an output window.

35. The machine-readable medium of claim 31, wherein the different categories included different product and service categories.

36. A machine-readable medium that provides instructions, which when executed by a processor, cause said processors to perform operations comprising:

storing attributes of items of different categories into a generic attribute table of a database, wherein at least one attribute entry of the attribute entries is shared across at least two different categories;

storing attribute values of the items of the different categories into an attribute value table of the database; and storing translation components of the values for the attributes of the items of the different categories into an attribute map table of the database, wherein each attribute value has an associated attribute in the generic attribute table and associated translation components in the attribute map table, the associated attribute and the associated translation components to determine an attribute type and the category for the associated attribute value.

37. The machine-readable medium of claim 36, further including storing valid values for the attributes of the items of the different categories into an attribute validity table of the database, wherein each attribute value has associated valid values in the attribute validity table, the associated valid values to validate the associated attribute value.

38. The machine-readable medium of claim 37, wherein the valid values include a range of values that are valid.

39. The machine-readable medium of claim 37, wherein the attribute validity table includes valid values for the attributes that are shared by at least two items from at least two different categories.

40. The machine-readable medium of claim 36, wherein the associated translation components determine a display position for the associated attribute value within an output window.

41. The machine-readable medium of claim 36, wherein the associated translation components determine a display length for the associated attribute value within an output window.

42. The machine-readable medium of claim 36, wherein the generic attribute table includes an attribute entry for an attribute that is shared by at least two items from at least two different categories.

43. The machine-readable medium of claim 36, wherein the different categories included different e-commerce categories.

* * * * *